(12) United States Patent
Morgan

(10) Patent No.: US 10,815,779 B2
(45) Date of Patent: Oct. 27, 2020

(54) UNDERGROUND TOOL PROVIDING ON-LINE INFORMATION FOR IN SITU ASSESSMENT OF AQUIFER QUALITY AND FLOW RATE

(71) Applicants: AQUARESOURCES SA, Buenos Aires (AR); Victor Roberto Poggi, Caba (IT)

(72) Inventor: Enrique Juan Morgan, Buenos Aires (AR)

(73) Assignee: AQUARESOURCES SA, Buenos Aires (AR)

( * ) Notice: Subject to any disclaimer, the term of this patent is extended or adjusted under 35 U.S.C. 154(b) by 0 days.

(21) Appl. No.: 16/099,832

(22) PCT Filed: May 5, 2017

(86) PCT No.: PCT/EP2017/060793
§ 371 (c)(1),
(2) Date: Nov. 8, 2018

(87) PCT Pub. No.: WO2017/194412
PCT Pub. Date: Nov. 16, 2017

(65) Prior Publication Data
US 2019/0112923 A1  Apr. 18, 2019

(30) Foreign Application Priority Data

May 9, 2016  (AR) .............................. P20160101333

(51) Int. Cl.
*E21B 49/10* (2006.01)
*G01N 1/20* (2006.01)
(Continued)

(52) U.S. Cl.
CPC .............. *E21B 49/10* (2013.01); *E02D 1/027* (2013.01); *E02D 1/06* (2013.01); *E21B 47/06* (2013.01);
(Continued)

(58) Field of Classification Search
CPC .......... E21B 49/10; E21B 49/08; E21B 47/10; E21B 47/065; E21B 47/06;
(Continued)

(56) References Cited

U.S. PATENT DOCUMENTS 2,982,130 A * 5/1961 McMahan ............... E21B 49/10
73/152.23
3,147,807 A * 9/1964 Whitten .................. E21B 49/10
175/4

(Continued)

OTHER PUBLICATIONS

International Search Report for PCT/EP2017/060793 dated Sep. 8, 2017.
(Continued)

*Primary Examiner* — Brad Harcourt
(74) *Attorney, Agent, or Firm* — Nixon Peabody LLP; Jeffrey L. Costellia

(57) ABSTRACT

An underground sampling tool (HTMS) for underground water analysis of both quality and flow rate, providing the information required to perform an underground drilling and obtain uncontaminated water for crop irrigation, said tool comprising: a housing for the electronic and electrical controls, a housing for the hydraulic means controlled by the electric and electronic portion of the tool, a test body consisting of a variety of hydraulic circuits for operating the various operating valves of the tool, wherein said test body further comprises: a rear shoe on an axial axis of the tool, wherein said rear shoe is driven by two telescoping pistons simultaneously that arise from the inside of the tool when driven by a signal of a surface equipment operably enabled (Continued)

for this purpose, and a front shoe, driven by several pistons which are housed below the front shoe, not shown in the figures, and driven by one or more electro-pneumatic devices acting jointly and generating a progressive forward or backward movement of the front shoe. Process for the collection and analysis of samples in a wellbore using said tool.

17 Claims, 8 Drawing Sheets

(51) Int. Cl.
*E02D 1/06* (2006.01)
*E21B 49/08* (2006.01)
*E02D 1/02* (2006.01)
*G01N 1/14* (2006.01)
*E21B 47/07* (2012.01)
*E21B 47/06* (2012.01)
*E21B 47/10* (2012.01)

(52) U.S. Cl.
CPC .............. *E21B 47/07* (2020.05); *E21B 47/10* (2013.01); *E21B 49/08* (2013.01); *G01N 1/14* (2013.01); *G01N 1/2035* (2013.01); *G01N 1/2042* (2013.01); *E21B 49/0875* (2020.05)

(58) Field of Classification Search
CPC .. E21B 2049/085; G01N 1/14; G01N 1/2035; G01N 1/2042; E02D 1/02; E02D 1/06
See application file for complete search history.

(56) References Cited

U.S. PATENT DOCUMENTS

| | | | |
|---|---|---|---|
| 3,813,936 | A | 6/1974 | Urbanosky et al. |
| 3,859,851 | A | 1/1975 | Urbanosky |
| 4,287,946 | A | 9/1981 | Brieger |
| 5,233,866 | A | 8/1993 | Desbrandes |
| 5,303,775 | A | 4/1994 | Michaels et al. |
| 5,567,889 | A | 10/1996 | Sullivan et al. |
| 6,339,886 | B1 * | 1/2002 | Reinhardt ............... E21B 47/08 33/302 |
| 2009/0025926 | A1 * | 1/2009 | Briquet ................. E21B 17/028 166/105 |
| 2011/0162836 | A1 | 7/2011 | Church |
| 2013/0213645 | A1 | 8/2013 | Proett et al. |

OTHER PUBLICATIONS

Georgian Office Action for PCT/EP2017/060793 dated Mar. 13, 2020.

* cited by examiner

UNDERGROUND TOOL PROVIDING ON-LINE INFORMATION FOR IN SITU ASSESSMENT OF AQUIFER QUALITY AND FLOW RATE

TECHNICAL FIELD

The present invention relates to the assessment of aquifer reservoirs intended for use in agriculture, more particularly to devices and methods used to measure in situ the qualitative and quantitative values required to determine whether a reservoir is suitable for agriculture.

BACKGROUND

Hunting, fishing, agriculture, and the different ways of taming nature, have been essential for the development of communities.

The ancient industry of agriculture has strongly influenced all civilizations in their strive to feed their growing population.

Crops and their production have undergone a qualitative and quantitative leap during the twentieth century as never before in history, mainly as a result of the evolution of three fields of technology:

1—biotechnology
2—agricultural techniques
3—phytosanitation and fertilizers

The first milestone occurred during the 1920s, when the first hybrid materials were obtained in maize crops, by crossing of pure lines which resulted in an exponential yield increase.

This kicked off the global business in hybrid seed research and production. Maize cultivation was followed by other crops that incorporated the new technologies.

The second milestone came only after more than half a century of research and development, and extensive trial and error experimentation. In the 1980s, it was possible to identify certain features in plant genes, whose expression affects not only yield levels, but also certain features related to their quality.

Nevertheless, there are certain methodologies in this industry that have not been changed by technological developments, and they refer to one of the essential elements in the production chain: "water."

Since its inception, the germplasm industry has invested millions of dollars in the production of hybrid seeds and varieties, which are the parents of future grains, commodities that are then also marketed by a small club of multinational companies, historically known as the five sisters (Cargil, Dreyfus, Bunge, Continental, and the Swiss Group Andre), who controlled the grain business throughout the 20th century.

The great power of the world became aware of their power only during the Soviet invasion of Afghanistan.

At the crucial moment of said production process, in which the volume of products to be sold was defined, they should ask Mother Nature not to fail, "it must rain."

This is "one" of the reasons why only five regions on the planet account for 99% of the world's food production.

In the 1970s, the technological incorporation in the food production process started to overcome this contingency through mechanical irrigation, whose aim was and is to avoid the threat of lack of water at the critical moment of plant development.

In the last 40 years, technological advances largely eliminated this risk. Today there is no seed production in the germplasm industry without having a highly technified irrigation system in its process, which gives the final product the required water dosage required for growth.

However, in spite of such evolution, the aquifer identification systems that assess water quality and quantity, as well as the collection mechanisms involved have not undergone many changes.

In the present situation it is necessary to find irrigation water whose characteristics define it as suitable for its intended use, and this not only takes time but also sometimes involves excessive costs that affect the marketing values of products. The possibility of assessing a priori aquifers quality and flow rate and thus reducing drilling costs has been considered as an alternative.

Despite the technological advances, today the old trial and error method is still being used. Said method consists in drilling wells until a groundwater layer appropriate to one's needs is found, and that in case the quality of the water found is not appropriate one must decide whether to take the risk and continue drilling, (increase of costs), until a deeper groundwater layer is found or to start drilling a new well elsewhere.

To the risks of the well itself it is also obvious that the cost of drilling is directly related to the depth of the well as it involves the drilling equipment to be rented and the different maneuvers to be made to ensure successfully reaching a desired depth and in case of overcoming all these stages still remains the need to investigate whether the water found in the groundwater layer has the appropriate features for the irrigation of crops, if it is a flowing well, if it has to be pumped to be extracted, and if it is worth the investment of introducing a pipe into the well.

In order to determine the quality of the water, a tool is needed for in depth collection of samples from the well and thus collect data of the water present in the formation.

The history of this type of tools began in the mid-twentieth century as an alternative way of measuring the pressure of a formation, estimating the permeability of a productive layer, its temperature and the possibility of retrieving to the surface a sample of the formation fluid. The tool is introduced into the well by means of a steel cable and electrical conductors; in oil jargon this method is referred to as wire line.

The first tools were operated by positioning them at a certain depth inside the well and after pressing the testing shoe or seal in the formation an explosive charge was detonated in the formation to open flow channels in said formation of the reservoir and fill the tool's sample-storage chambers. These chambers communicated with the formation by means of an internal pipe of the tool known as flow line, and this pipe and the storage chamber were at atmospheric pressure when the test began.

A new tool appeared in 1975 using a method similar to the previous one, but technologically improved, having a design that allowed collecting samples in a repetitive way in the same layer or in different layers along a well. Before this, the tool could collect only one sample and it had to be raised to the surface to be reconditioned before collecting another sample. In turn, this new tool created the concept of the pre-test chamber that allowed to collect from the formation a small amount of fluid while registering pressure values from the time the pre-test chamber was opened and the shape of the curve as shown in FIGS. 6A and B, 7A and B, and 8A and B, where a first pressure drop and a subsequent increase can be seen until a stable value is reached, thus allowing to measure the actual pressure of the formation. This value, the analysis of drawdown when the pre-test chamber is opened, and the build up time until the pressure inside the pre-test chamber stabilizes, allows inferring and calculating the pressure of the formation fluid and also the permeability of the selected layer.

Initially this tool had a single pre-test chamber and later it consisted of two chambers, one measuring 2 cm$^3$ and the other 5 cm$^3$, where the one with greater capacity was opened according to the results of the first test.

Subsequently, a variable-capacity pre-test chamber was added to the tool, which was increased by the displacement of a piston located inside the chamber.

At present, there are different tools for collecting samples of a formation fluid, although the tools mentioned above can still be used. The current tools can not only be introduced into the well by means of a cable, but also by means of a drill pipe when it comes to horizontal wells.

In addition, now the quality of pressure and temperature gauges has substantially improved. In the past, the industry used strain gauges, as well as quartz gauges and, more recently, crystal quartz gauges are being used. Strain gauges have a better dynamic response since they reach a stable measurement value faster than quartz gauges but they are not as accurate in measuring as the latter, which outperform them as regards resolution and accuracy, but require a long stabilization period when there are sudden pressure and temperature variations inside the well.

They have now been replaced by quartz crystal gauges that offer a dynamic response such as that of strain gauges and an accuracy similar to that of quartz gauges.

The last generations of tools provide substantial improvements in the sample-collection capacity since they are assembled according to the measurement requirements and can consist of different modules such as:
  two front shoes with a seal located diametrically opposed, in order to diametrically assess permeability differences in the layers;
  front shoes in different sections of the tool in order to vertically assess the mobility of fluids within the layer;
  a section with two plugs positioned to isolate a large layer and produce the suction of drilling mud in that space of the well to measure the evolution of the formation fluid;
  provision of a pump allowing the formation fluid to be pumped into the well, for cleaning and conditioning it for sampling; and
  identification of the fluid passing through it by means of a resistivity measurement and a light absorption analysis in the visible and near-infrared region.

In order to establish whether water from an underground layer is suitable for use in crop irrigation, a tool called underground sampling tool (HTMS) is proposed as well as a method that uses the HTMS, for measuring in situ the properties of the formation fluid and assessing not only the permeability of the sand of the aquifer, and its potential flow rate, but also its pressure, which will be an indication of the type of collection equipment to be used, its resistivity or its salinity equivalence at a given temperature, its pH value, its sodium content and other cations and anions, its temperature, etc., providing invaluable information for decision-making as regards the following steps of the operation, with the expensive casing of the well and cementing of the casing pipe, in order to isolate the groundwater layers from each other and avoid contamination of the good groundwater layers with water of undesirable groundwater layers.

SUMMARY OF THE INVENTION

The present invention is directed to a tool for providing on-line information on quality and flow rate of underground aquifers to obtain uncontaminated water for crop irrigation, said tool comprising:
  a housing for the electronic and electrical controls of the HTMS,
  a housing for the hydraulic means controlled by the electrical and electronic controls of the HTMS,
  a test body consisting of a variety of hydraulic circuits for driving different operating valves of the HTMS, where said test body further comprises:
    A rear shoe on an axial axis of the HTMS, where said rear shoe is simultaneously driven by two telescoping pistons arising from inside the HTMS, and
      a front shoe, driven by several pistons, also telescopic, housed below the front shoe, not shown in the figures, moved by one or more electro-pneumatic devices acting jointly and generating a progressive forward or backward movement of the front shoe.

Preferably, two supplements may be added to the rear shoe to increase its fixation diameter in large diameter wells.

In addition, the front shoe comprises:
  a removable seal pad which is fixed to the front shoe structure, where said seal pad is selected from a variety of rubber pads of different hardness, according to the formation of the well to be tested, and where said seal pads have a toroidal shape with a recess in the central circumference of the toroid.

In another embodiment, the front shoe body comprises:
  a probe barrel or cylinder located in the center of the toroidal shaped seal pad, which protects it, where said hollow probe cylinder is internally formed by a series of grooves in the probe cylinder acting as a filter in the probe cylinder, where, within said grooved cylinder, a probe piston moves, being in an extended position whenever the seal pad contacts the formation while serving as a stopper plug between the formation and the internal portion of the HTMS.

Preferably, the front shoe body has a cylindrical hole, which in turn contains the probe barrel or cylinder and the probe piston, where this cylindrical hole in the front shoe body forms a chamber whose outlet is the beginning of the flow line that travels along the HTMS.

Also preferably, the flow line has one or more branches communicating with various measuring devices and with the sample storage tanks, with the pre-test chamber or with the suction pump or the hydrostatic column of the well.

Also preferably, the flow line in at least one or more branches comprises pressure, temperature, conductivity, pH, Calcium content, Sodium content, Magnesium content, and Potassium content gauges.

Particularly, in one of its multiple branches, the flow line is coupled to the inlet of a pressure-equalizing valve, where the outlet of said equalizing valve is in communication with the hydrostatic column of the well.

Also, in particular, in one of the several branches, the flow line is coupled to the inlet of a pre-chamber valve whose outlet is connected to a pre-test chamber of variable capacity by means of a pre-test piston inside the pre-test chamber.

Preferably, the pre-test chamber contains a pre-test piston whose function is to adjust the volume of the pre-test chamber from 0 to 20 cm$^3$ based on the position of the piston stroke, where the test volume value is controlled from the surface.

Also preferably, at least one or more of several flow line branches are coupled with the inlet of the one or more tank valves whose outlets communicate with the inlets of the sample storage tanks.

The HTMS further comprises a suction pump for draining the part of the layer flooded by the drilling mud prior to performing the measurement in the sample of the formation fluid.

In addition, in onen of its multiple branches, the flow line is coupled to the inlet of the suction valve whose outlet is connected to the suction pump inlet.

Likewise, the suction pump outlet is connected to the equalizing valve inlet, communicating, when the equalizing valve and the suction valve are open, the formation being tested with the hydrostatic column of the well.

It is another object of the present invention to provide a process for the collection and in situ analysis of samples from a wellbore to obtain information regarding uncontaminated aquifers for crop irrigation, using the underground sampling tool described, said process consisting of the following steps:

A) connecting the underground sampling tool (HTMS) to one or more data collection and assessment equipment on the surface capable of receiving and processing the values of several underground measurements and sending the commands from the surface to the HTMS by either electric wire or fiber optic cable, said cable providing in turn mechanical support to the weight of the tool and the cable itself inside the well;

B) introducing the HTMS into the well at a speed from 9 to 15 meters per minute checking pressure and temperature measurements of the hydrostatic column as the tool moves down the hole into the well and checking that when said downhole movement stops both the temperature and the pressure of the hydrostatic column are rapidly stabilized;

C) positioning the HTMS at the level of a fluid-producing layer, whose depth has been calculated by testing the samples collected from the formation during wellbore drilling and/or measured or performed by other means;

D) mechanically fixing the HTMS to the side walls of the well; and

E) releasing from one to two meters of cable to verify the proper anchoring of the HTMS taking into account the cable tension value; and F) determining the characteristics of the formation fluid under study.

Additionally, process step F) of the process comprises:

a) mechanically fixing the HTMS to the well sidewall at the calculated depth to stop fluid communication between the hydrostatic column and the well drilling mud of the HTMS measurement systems and the formation layer to be analyzed;

b) electrically and electronically operating the hydraulic pre-test mechanism from surface equipment, which leads to the following sequential and automatic steps:

i. introducing the probe barrel or cylinder and probe filter into the formation, ii. closing the equalizing valve, iii. retracting the piston into the probe barrel or cylinder, allowing fluid communication between the formation liquid through the grooved cylinder or filter with the flow line, and iv. opening the pre-chamber valve of the pre-test chamber allowing the pre-test chamber to be filled with a volume of liquid equivalent to the volume previously selected from the surface controls;

c) checking from the surface drawdown time in the pre-test chamber by monitoring build up time;

d) based on formation permeability results calculated from drawdown and build up values, either collecting formation fluid in one of the sample storage tanks or draining the flooded area in the measured layer of interest.

In addition, in step d) if it is decided to collect a sample from the formation in one of the several sample tanks this is carried out following an instruction from the surface equipment in the following sequence:

i. opening the tank valve, which puts the flow line in fluid communication with at least one of the sample storage tanks;

ii. checking drawdown time in the flow line and recording on the surface build up in the flow line and the time of said build up; and iii. upon filling the sample storage tank, running from the surface equipment the closing process of at least one sample storage tank.

Likewise, draining of the flooded area in the measured layer of interest is carried out upon an instruction from the surface equipment in the following sequence:

i. opening the equalizing valve in the flow line to let the formation fluid in fluid communication with the hydrostatic column of the well and the pre-test chamber;

ii. operating the suction pump in order to drain the flooded area in the formation by drilling mud taking said product from the formation layer to the hydrostatic column of the well, calculating on the surface the quantity of liters drained through the flow line to the hydrostatic column of the well;

iii. deactivating the suction pump and shutting the equalizing valve and the suction valve of the flow line leaving the equipment in the same initial conditions before draining; and iv. waiting until stabilization of pressure in the pre-test chamber.

In addition, if the test proves to be successful or if it fails due to any technical cause or problem in the process (due to plugging of the test probe filter, loss of sealing in the toroidal seal pad of the front shoe of the HTMS, or low permeability in the formation), the HTMS must be detached, running from the surface the retract command that will follow the sequential and automatic steps as follows:

i. shutting the inlet tank valves of the sample storage tanks;

ii. opening the equalizing valve;

Iii. ejecting the fluid from the pre-test chamber by displacement of the pre-test piston;

iv. shutting the prechamber valve of the pre-test chamber;

v. displacing the probe piston from the probe barrel or cylinder to shut the flow line communication with the formation;

vi. retracting the probe barrel or cylinder;

vii. picking up the one to two meters of the cable released when the HTMS was fixed to the well before measurement;

viii. detaching the HTMS by retracting the telescopic pistons of the rear shoe and the front shoe;

ix. going down a few meters to check that the HTMS does not remain fixed to the well; and x. looking for another layer of interest.

Preferably, in any of the situations of filling the pre-test chamber or any of the sample storage tanks or the formation draining tank, the values of the measurements are recorded on the surface, in the flow line from the:

temperature,
pressure,
electrical conductivity (EC),
pH,
Calcium content,

Sodium content,
Magnesium content and
Potassium content gauges.

Figure 6A:
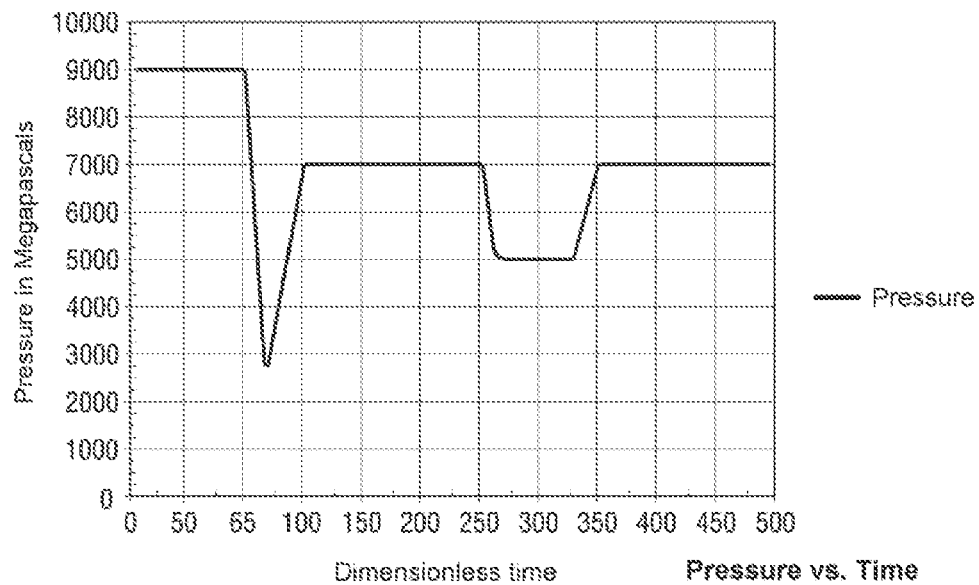
Figure 6B:
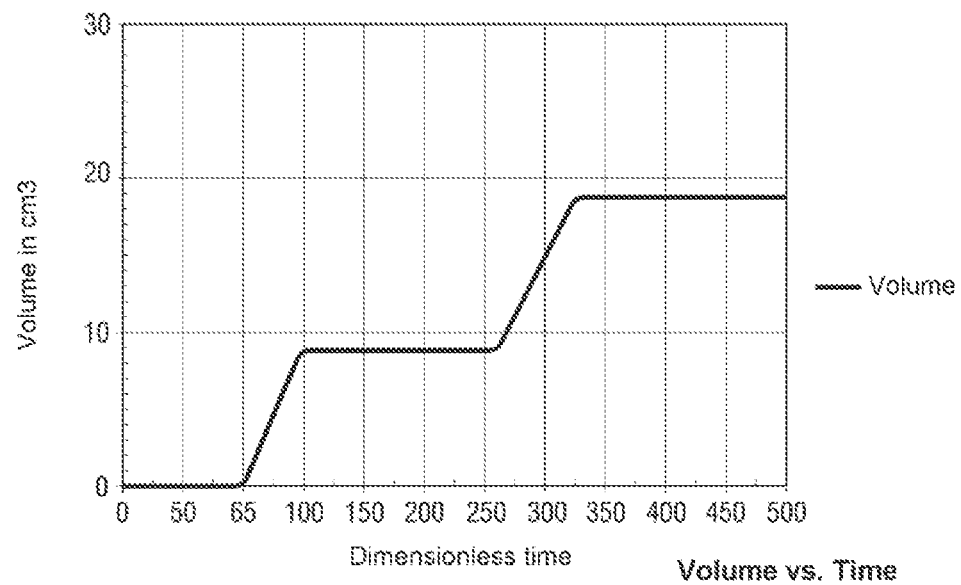

In order to simplify the explanation of the P/V graphs versus dimensionless T graphs, the indications given in FIGS. 6A and 6B must be taken as reference for the remaining graphs.

FIG. 6 A shows a measurement in a layer with very good permeability with a 7000 MPa final reservoir pressure. The test is conducted with a double-opening of the pre-test chamber: first the pre-test chamber is opened 9 cm$^3$ at an X opening speed and then when reading and volume are stabilized the chamber is opened another 9 cm$^3$ at an opening speed of 2× (double than the first one), totalizing a 18 cm$^3$ volume.

FIG. 6 B shows the same measurement of FIG. 6 A where the filling chart of the pre-test chamber is shown after the first opening with a capacity of 9 cm$^3$ and the second opening at a speed twice as high as the first one up to 18 cm$^3$.

Figure 7A:
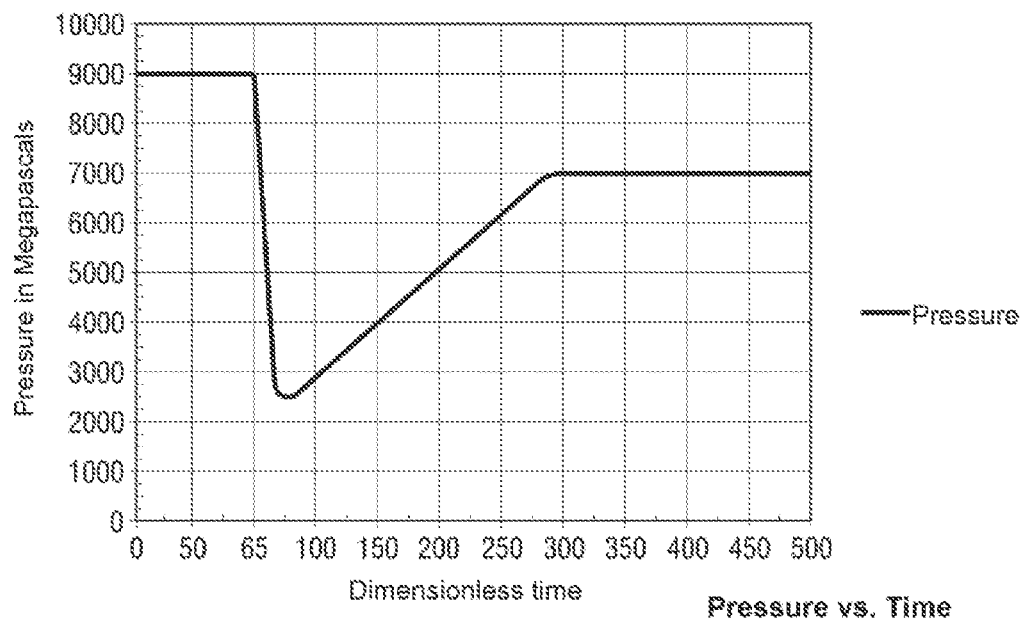
Figure 7B:
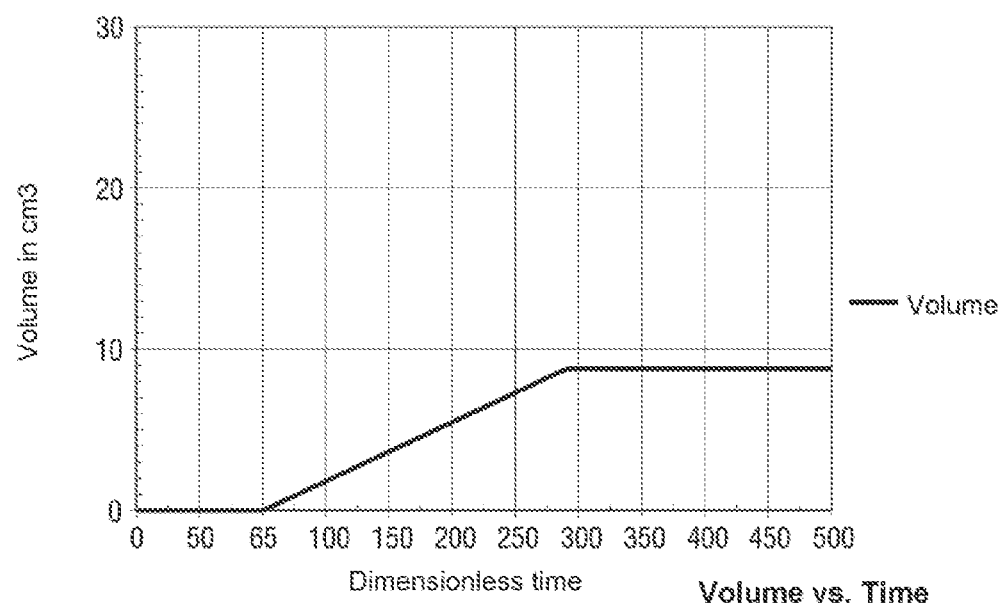

FIG. 7 A shows a measurement in a layer with a fair to good permeability with a 7000 MPa final reservoir pressure.

FIG. 7 B shows the same measurement of FIG. 7 A where the filling chart of the pre-test chamber is shown after the first opening with a capacity of 9 cm$^3$ which shows that although it reaches 9 cm$^3$ this occurs over a longer time than in the previous case. Both graphs of FIGS. 7A and B show that this layer has lower permeability to fluid movement than those of FIG. 6 above.

Figure 8A:
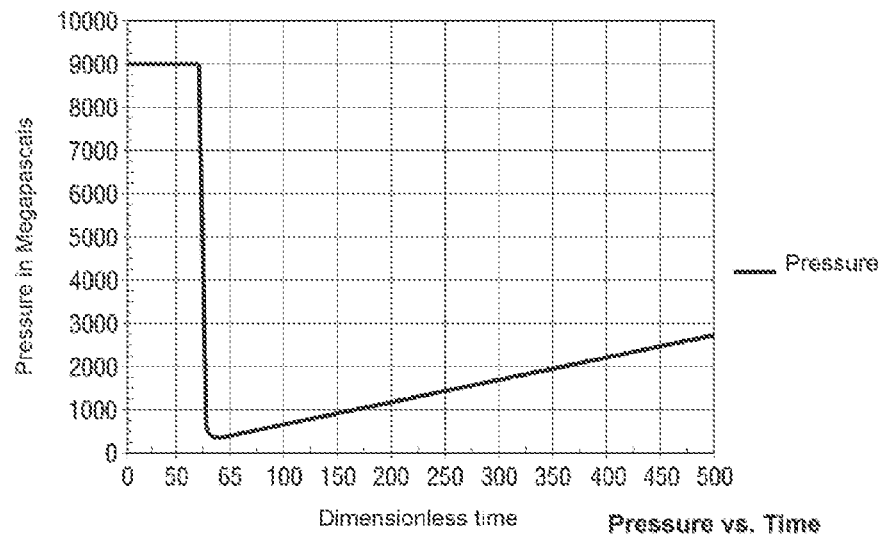
Figure 8B:
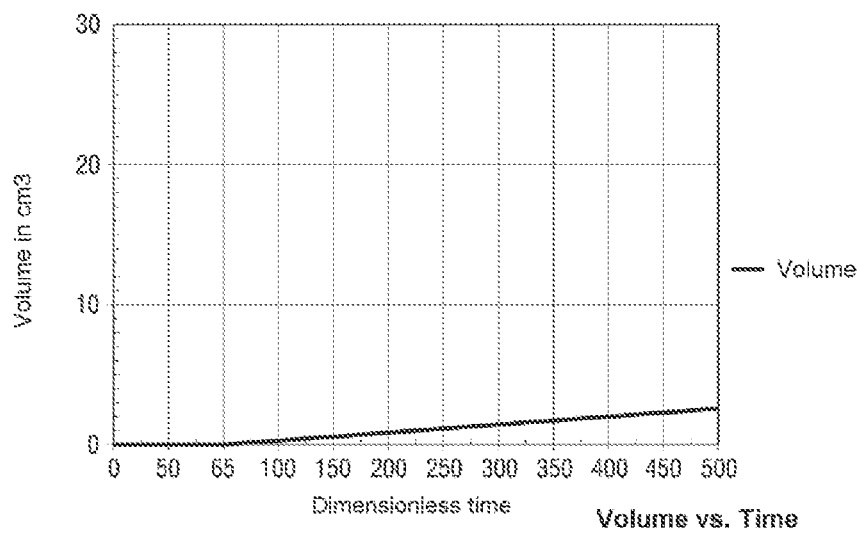

FIG. 8 A shows a measurement in a layer with very low permeability and undefined final pressure. The measurement was suspended due to the high-pressure built-up time. This implies a layer without interest.

FIG. 8 B shows the same measurement of FIG. 8 A showing the fill-up graph of the pre-test chamber with very low volume of recovery after the 9 cm$^3$ volume opening of the chamber.

DETAILED DESCRIPTION OF THE INVENTION

It is, therefore, a primary object of the present invention, to provide an underground sampling tool (HTMS) (1) for obtaining on-line information on the quality and flow rate of underground aquifers in the search for uncontaminated water for crop irrigation, which is designed to extract liquids impregnating the subterranean formations that are reached by drilling, and analyzing them in situ.

Figure 1:
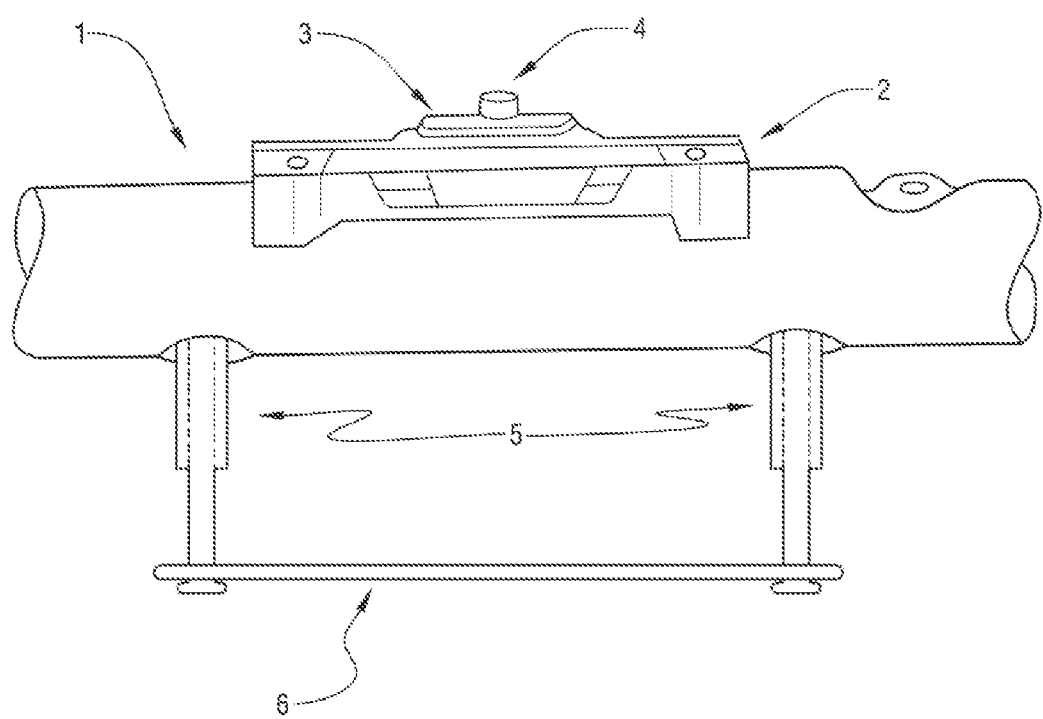
FIG. 1 shows the portion of the underground sampling tool (HTMS) characteristic for the sampling of a formation.

The HTMS (1) of FIG. 1 according to the present invention includes for its basic operation all the elements of a modern tool as regards the means for attaching it to the borehole walls.

A rear shoe (6) on an axial axis of the tool, which can be called 180° axis to differentiate it from the rear shoe (6), attached to two telescopic pistons (5) simultaneously from the inside and outside driven by a signal of a surface equipment operatively enabled for this purpose (as shown in FIG. 1).

A front shoe (2), on the 0° axial axis opposite to the rear shoe (6), on the 180° axial axis of the tool, attached to several pi stons housed below the front shoe (2), which are not shown in the figures, and that are driven by one or more mechanisms acting jointly but in turn separately in time generating the progressive movement of the front shoe (2) having a hard rubber toroidal seal pad (3) with a recess (as shown in FIG. 1).

Both (front (2) and rear (6)) shoes, hydraulically driven as they extend towards the diametrically opposite walls of the well, end up leaning on them and the pumps acting on the hydraulic fluid raise the pressure thereof in the ducts of all the pistons up to a preset value, called fixing pressure, sufficiently strong that the HTMS tool (1) remains literally hunging from the well walls by both (front (2) and rear (6)) shoes) which exert a diametrically opposite force towards the walls of the well. The front shoe (2) as the seal pad (3) extends and rests on the well wall isolates the center of the toroidal seal pad (3) as well as that part of the formation facing it, from the rest of the well and from the drilling fluid column as shown in FIGS. 3 and 4.

Figure 3:
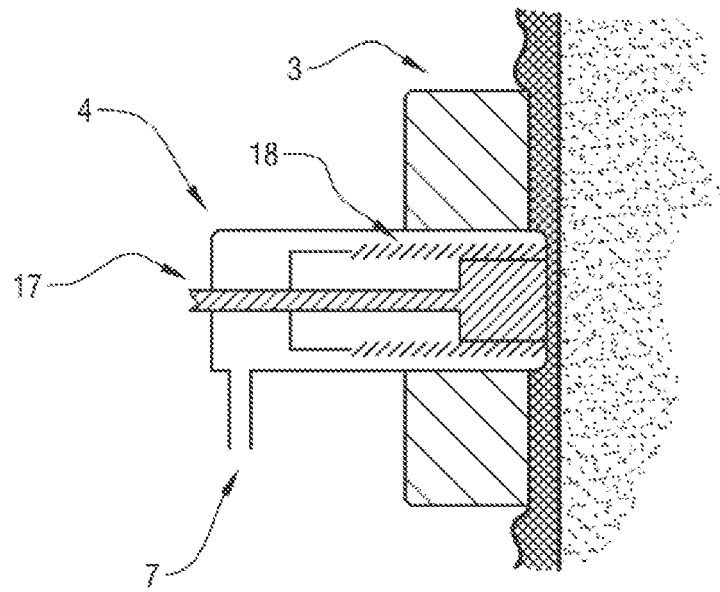
FIG. 3 shows a more detailed representation of the moment the HTMS has placed the frontal shoe and the toroidal seal pad against the formation without having introduced the probe barrel or cylinder into the formation to assess the characteristics of the underground aquifers.
Figure 4:
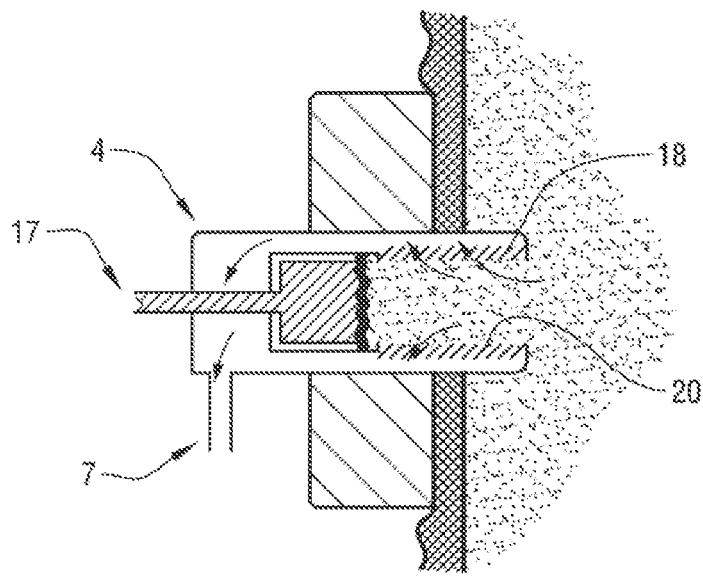
FIG. 4 shows another more detailed representation of the moment the HTMS has placed the frontal shoe and the toroidal seal pad against the formation the probe barrel or cylinder having been introduced into the formation and retracted the probe piston releasing the filter so the formation fluid enters within the HTMS in order to assess the characteristics of the underground aquifers.
Figure 5A:
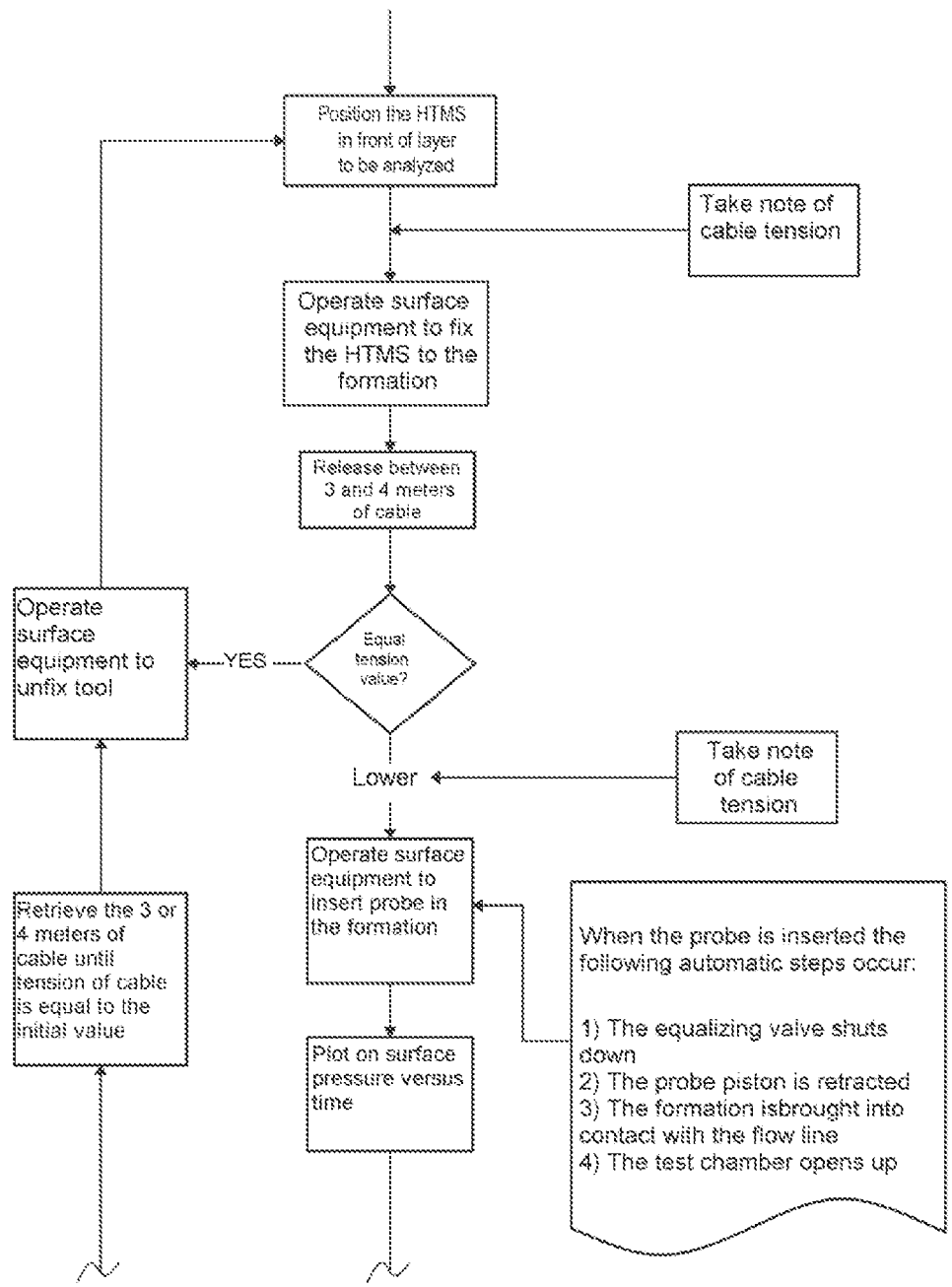
FIG. 5 shows a flow chart of a process for using an HTMS to assess the characteristics of underground aquifers.
Figure 5B:
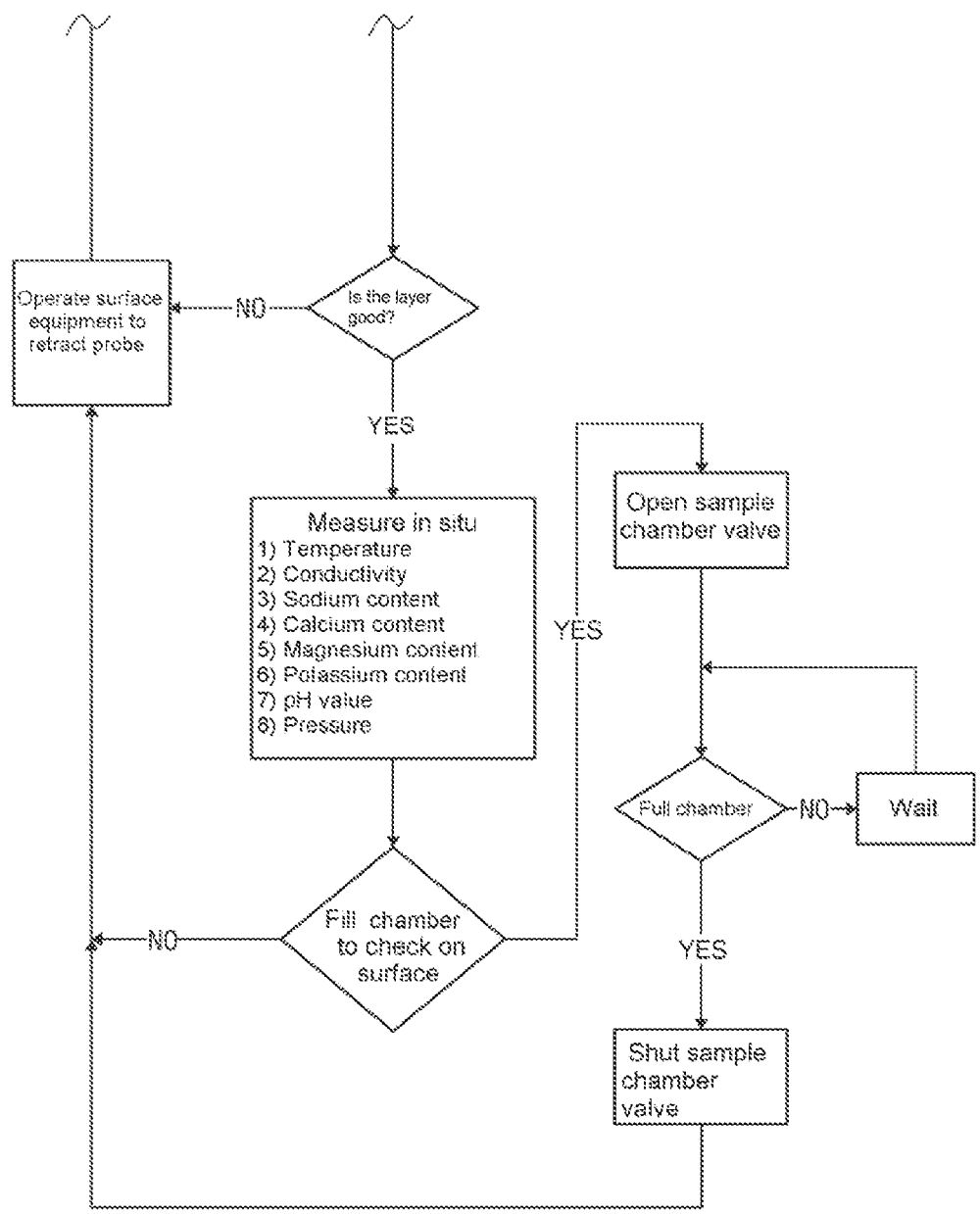

The front shoe (2) in turn has inside a probe barrel or cylinder (4) which is located in the center of the toroid of the seal pad (3), said probe barrel or cylinder (4) is formed by a grooved cylinder acting as a filter within which there is a cylindrical piston which is in an extended position at the time of positioning the seal pad (3) against the formation while at the same time serves as a stopper plug between the formation and the interior of the tool, as shown in FIGS. 3 and 4.

Figure 2:
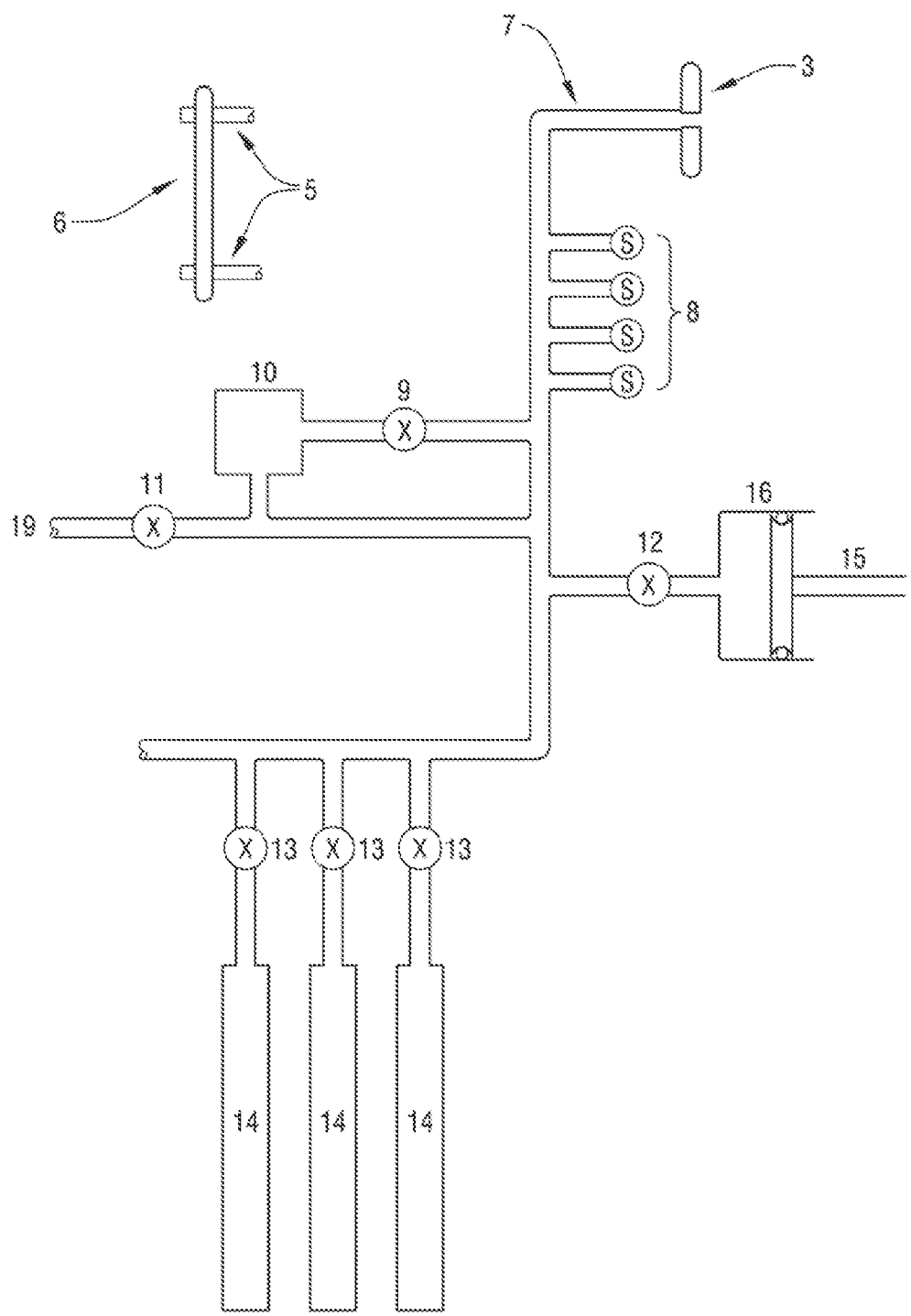
FIG. 2 shows a representation of a preferred embodiment of an HTMS for assessing the characteristics of underground aquifers.

In turn, the probe barrel or cylinder (4), the filter and the piston are inside a cylinder, forming a chamber whose outlet connects to the beginning of the flow line (7), it contains different gauges, and several branches of the flow line (7) in which is located an equalizing valve (11) whose outlet is in communication with the hydrostatic column of the well, as shown in FIG. 2.

A prechamber valve (12) is coupled to the flow line (7), the outlet of which is connected to a pre-test chamber (16) with a pre-test piston (15) whose function is to adjust the volume of the pre-test chamber (16) from 0 to 20 cm$^3$ based on the position of the piston stroke where the value of the test volume is controlled from the surface as well as its movement speed.

Said volume variation of the pre-test chamber (16) is performed based on the needs of the assessment and are determined from the surface by means of a measuring equipment and according to the evolution of the previous measurements in the same layer.

In the flow line path (7) there are different gauges (8) which assess with the entrance of the fluid from the underground layer from which a sample is collected, the values determining the quality of the water, said gauges are:
temperature gauge;
pressure gauge;

electrical conductivity (EC) gauge; whose desirable value is from 0 to 6 dS/m;

pH gauge; whose desirable value is from 6.2 to 7.8;

SAR index measurement gauge, whose desirable value is from 0 to 20;

Calcium content gauge;

Sodium content gauge;

Magnesium content gauge;

Potassium content gauge;

Over the flow line (7) and after the branches of the measurement gauges (8) there is a branch which communicates through a suction valve (9) a suction pump (10); this pump when the equalizing (11) and suction (9) valves are in the proper status communicates directly the formation with the hydrostatic column (19) of the well in order to be able to suction from the former the drilling fluid having flooded said layer and drain it to the hydrostatic column of the well.

At the end of the flow line (7) it is possible to provide one more sample storage tank (14) in order to store the water from the production area to be transported to the surface in order to carry out, if required, a laboratory test.

It is another object of the present invention, a process for the collection and in situ analysis of samples from a wellbore to obtain information regarding uncontaminated aquifers for crop irrigation, using the HTMS (1), said process consisting of the following steps:

A) connecting the tool for the collection of underground formation samples (HTMS (1)) to one or more assessment and data collection equipment in the surface capable of receiving and processing the values of several underground measurements and sending the commands from the surface to the HTMS (1) by either electrical cable or fiber optic cable, and that in turn said cable provides the mechanical support to the weight of the tool and the cable itself inside the borehole;

B) introducing the HTMS (1) into the well at a speed from 9 to 15 meters per minute checking pressure and temperature measurements of the hydrostatic column as the downhole movement progresses inside the well and checking that when said downhole movement stops both the temperature and the pressure of the hydrostatic column are rapidly stabilized, otherwise the speed of the downhole movement into the well must be reduced;

C) positioning the HTMS (1) at the level of a fluid-producing layer, whose depth has been calculated through the examination of the samples collected from the formation during wellbore drilling and/or measured or performed by other means;

D) mechanically fixing the HTMS (1) to the side walls of the well formation; and E) releasing from one to two meters of cable to verify the anchoring of the HTMS taking into account the cable tension value; and F) being able to establish the fluid characteristics of the formation fluid under study.

Step F) comprises the following steps:

a) mechanically fixing the HTMS (1) to the well wall at the depth calculated to stop fluid communication of the hydrostatic column from the well drilling mud of the HTMS (1) measurement systems and the formation layer to be analyzed;

b) electrically and electronically triggering the hydraulic pre-test mechanism from the surface equipment, which leads to the following sequential and automatic steps:

i. introducing the probe barrel or cylinder (4) and probe filter into the formation, ii. shutting the equalizing valve (11), iii. retracting the probe piston (17) into the probe barrel or cylinder, allowing fluid communication between the formation liquid through the grooved probe barrel or cylinder (4) with the flow line (7), and iv. opening the prechamber valve (12) of the pre-test chamber (16) allowing the filling of the pre-test chamber (16) with a volume of liquid equivalent to the volume previously selected from the surface;

c) checking from the surface pressure drawdown time in the pre-test chamber (16) and controlling build up time;

d) based on the formation permeability results calculated from the drawdown and build up values, collecting a sample in one of the sample storage tanks (14) or draining the flooded area in the measured layer of interest.

In step d) above, the collection of a sample of the formation in one of several sample tanks is carried out upon an instruction from the surface equipment in the following sequence:

i. opening the tank valve (13) which puts the flow line (7) in fluid communication with at least one of the sample storage tanks (14);

ii. checking drawdown time in the flow line (7) and recording on the surface the progressive build up time in the flow line (7); and iii. upon filling the sample storage tank (14), running from the surface equipment the closing process of at least one sample storage tank.

Alternatively, in said step d), the draining of the flooded area in the measured layer of interest is performed upon an instruction from the surface equipment in the following sequence:

i. opening the equalizing valve (11) in the flow line (7) to let the formation fluid in fluid communication with the hydrostatic column (19) of the well and the pre-test chamber (16);

ii. activating the operation of the suction pump (10) in order to drain the flooded area in the formation by the drilling mud taking said product from the formation layer to the hydrostatic column of the well, calculating on the surface the quantity of liters drained through the flow line (7) to the column of the well;

iii. deactivating the suction pump (10) and shutting the equalizing valve (11) of the flow line (7) leaving the equipment in the same initial conditions before draining; and iv. waiting until stabilization of pressure in the pre-test chamber (16).

In case the test proves to be successful or if it fails due to any technical cause or problem in the process, such as due to plugging of the test probe filter, loss of sealing in the toroidal seal pad of the HTMS' (1) seal, or low permeability in the formation, the HTMS (1) tool must be detached, running from the surface the retract command that will follow the following sequential and automatic steps:

i. shutting the tank valves (13);

ii. opening the equalizing valve (11);

iii. ejecting the fluid from the pre-test chamber (16) by displacement of the pre-test piston (15);

iv. shutting the prechamber valve (12) of the pre-test chamber (16);

v. displacing the probe piston (17) to shut the flow line (7) communication with the formation;

vi. retracting the probe barrel or cylinder (4);

vii. picking up the one to two meters of the cable released when the HTMS (1) was fixed to the well before measurement;

viii. detaching the HTMS (1) by retracting the telescopic pistons (5) of the rear shoe (6) and the front shoe (2) thereof;

ix. going down a few meters to check that the tool does not remain fixed to the well; and x. looking for another layer of interest.

In any of the situations of filling the pre-test chamber (16) or the sample storage tank (14) or the draining tank of the formation, the values of the measurements are registered on the surface by means of gauges present in the flow line (7), where said gauges (8) assess: temperature, pressure, electrical conductivity (EC), pH, Calcium content, Sodium content, Magnesium content, and Potassium content.

Knowing the EC, it is possible to approximately assess other water parameters, such as: salt content in the solution (in grams/liter)=EC (dS/m) at 25° C.×0.64; osmotic pressure of the solution (in atmospheres)=EC (dS/m)×0.36; and water salt content (in meq/L)=CE (dS/m)×10.

In addition, in relation to the EC, the US Riverside Salinity Laboratory classifies water in the following six groups:

Group C1 with an EC from 0.10 to 0.25 dS/m: "Low Salinity" water that can be used for irrigation of most crops on most soils with little likelihood that a salinity problem will develop in the soil.

Group C2 with an EC from 0.25 to 0.75 dS/m: "Medium Salinity" water that can be used for crop irrigation provided that there is at least a moderate amount of leaching of the soil. In general, most crops resist this water, without special practices for salinity control.

Group C3 with an EC from 0.75 to 2.25 dS/m: "High Salinity" water should only be used in well-drained soils and in salt resistant crops.

Group C4 with an EC from 2.25 to 4.00 dS/m: "Very High Salinity" water not suitable for irrigation, but may be used occasionally under very special circumstances. The soils must be permeable, drainage must be adequate, irrigation water must be applied in excess and very salt tolerant crops should be selected.

Group C5 with an EC from 4.00 to 6.00 dS/m: "Excessive Salinity" water should only be used in very special cases, taking extreme precautions.

Finally, group C6 with an EC from 6.00 to 10.00 comprises water not suitable for irrigation in any case or circumstance.

From this classification of the Riverside Salinity Laboratory only C1 and C2 are suitable for irrigation.

The risk of soil alkalinization by the irrigation water can be determined with the aid of the sodium adsorption ratio (SAR), which is calculated based on the equation:

$$[Na^+]/(([Ca^{2+}]+[Mg^{2+}])/2)^{1/2}$$

where, all concentrations are expressed in milliequivalents/liter. The importance of measuring SAR is that the sodium ion has a strong tendency to destabilize the soil structure, causing anorexia in plants.

In relation to the SAR (Sodium Adsorption Ratio) value, the US Riverside Salinity Laboratory classifies water in the following four groups:

Group S1 has a SAR value within the 0-10 range, and corresponds to water with low sodium content, useful for irrigation of most soils and crops.

Group S2 has a SAR value from 10 to 18, and corresponds to water of medium sodium content, useful for the irrigation of thick texture or organic soils with good permeability.

Group S3 has a SAR value from 18 to 26, and corresponds to water with high sodium content, only suitable for gypsum soils or soils with special management practices. They are not suitable for irrigation of highly sodium-sensitive soils, as are most of the fruit trees.

Group S4 has a SAR value over 26, and corresponds to water with very high sodium content, unsuitable for irrigation of most soils and crops.

In addition, under this classification of the Riverside Salinity Laboratory only S1 is suitable for irrigation.

Therefore, by making the determinations in depth it is possible to know the quality of the water present in a formation and assess the feasibility of its use for irrigation.

NUMERALS USED IN THE SPECIFICATION AND FIGURES

1 Body of the underground sampling tool (HTMS) or just HTMS
2 Front shoe
3 Seal pad
4 Probe barrel or cylinder
5 Telescopic piston
6 Rear shoe
7 Flow line
8 Gauges
9 Suction valve
10 Suction pump
11 Equalizing valve
12 Pre-chamber valve
13 Tank valve
14 Sample storage tanks
15 Pre-test piston
16 Pre-test chamber
17 Probe piston
18 Probe cylinder grooves
19 Hydrostatic column
20 Formation fluid

The invention claimed is:

1. An underground sampling tool (HTMS) for providing on-line information on quality and flow rate of an underground aquifer and identifying uncontaminated water for crop irrigation, said tool comprising:
a housing for the electrical and electronic controls,
a housing for the hydraulic means controlled by the electrical and electronic controls of the tool,
a test body consisting of a variety of hydraulic circuits for operating different tool operating valves, wherein said test body further comprises:
a rear shoe on an axial axis of the tool, wherein said rear shoe is simultaneously driven by two telescoping pistons arising from inside the tool, when signaled by a surface equipment operatively enabled to do so, and
a front shoe, driven by several pistons housed therebelow, wherein the pistons housed below the front shoe are moved by one or more electro-pneumatic devices acting jointly and generating a progressive forward or backward movement of the front shoe, and wherein a front shoe body has a cylindrical hole which in turn contains a probe barrel or cylinder and a probe piston, wherein the cylindrical hole in the front shoe body forms a chamber whose outlet is the beginning of a flow line that travels along the tool, wherein the flow line has one or more branches connecting it to various measuring devices and to sample storage tanks, a pre-test chamber, a suction pump or a hydrostatic column of a well, and wherein the flow line is provided, in at least one or more branches, with pressure, temperature, conductivity, pH, Calcium content, Sodium content, Magnesium content, and Potassium content gauges (8).

2. The tool of claim 1, wherein the rear shoe is additionally equipped with supplements to increase its fixation diameter in large-diameter wells.

3. The tool of claim 1, wherein the front shoe further comprises:
a removable seal pad which is fixed to the front shoe structure, wherein said seal pad is selected from a variety of rubber seal pads of different hardnesses, according to the formation of the well to be tested, and wherein said rubber seal pads have a toroidal shape with a recess in the central circumference of the toroid.

4. The tool of claim 3, wherein the probe barrel or cylinder is located in the center of a toroidal shaped rubber seal pad, which protects it, wherein said probe barrel or cylinder contains a series of grooves therein which act as a filter, wherein within said probe barrel or cylinder there is a cylindrical piston which is in an extended position when the seal pad rests on the formation while serving as a stopper plug between the formation and the internal portion of the tool.

5. The tool of claim 1, wherein, in one of its multiple branches, the flow line is coupled with the inlet of a pressure-equalizing valve, wherein the outlet of said equalizing valve is in communication with the hydrostatic column of the well.

6. The tool of claim 1, wherein, in one of its multiple branches, the flow line is coupled to the inlet of a pre-chamber valve whose outlet is connected to a pre-test chamber of variable capacity.

7. The tool of claim 6, wherein the pre-test chamber contains an inner piston whose function is to adjust the volume of the pre-test chamber from 0 to 200 cm$^3$ based on the position of the piston stroke, wherein the test volume value is controlled from the surface.

8. The tool of claim 1, wherein at least one or more of the several flow line branches are coupled with the inlet of the one or more tank valves whose outlets are connected to the inlets of the sample storage tanks.

9. The tool of claim 1, further comprising a suction pump for draining the part of the layer flooded by the drilling mud prior to performing the measurement in the fluid sample of the formation.

10. The tool of claim 1, wherein, in one of its multiple branches, the flow line is coupled to the inlet of a suction valve whose outlet is connected to the suction pump inlet.

11. The tool of claim 10, wherein the suction pump outlet is connected to the equalizing valve inlet, connecting, when the equalizing valve and the suction valve are open, the formation with the hydrostatic column of the well.

12. A process for the collection and in situ analysis of samples from a wellbore to obtain information regarding uncontaminated aquifers for crop irrigation, using the underground sampling tool (HTMS) of claim 11, said process comprising the following steps:
A) connecting the tool for the collection of underground formation samples (HTMS) to one or more assessment and data collection equipment in the surface capable of receiving and processing the values of several underground measurements and sending the commands from the surface to the HTMS by either electrical cable or fiber optic cable, said cable in turn providing mechanical support to the weight of the tool and the cable itself inside the wellbore;
B) introducing the HTMS into the well at a speed from 9 to 15 meters per minute checking pressure and temperature measurements of the hydrostatic column as the downhole movement progresses inside the well and checking that when said downhole movement stops, both the temperature and the pressure of the hydrostatic column are rapidly stabilized;
C) positioning the HTMS at the level of a fluid-producing layer, whose depth has been calculated through examination of the samples collected from the formation during wellbore drilling and/or measured or performed by other means;
D) mechanically fixing the HTMS to the side walls of the well formation; and
E) releasing from one to two meters of cable to verify the proper anchoring of the HTMS taking into account the cable tension value; and
F) determining the fluid characteristics of the formation fluid under study.

13. The process of claim 12, wherein step F) comprises:
a) mechanically fixing the HTMS to the well sidewall at the depth calculated to stop fluid communication of the hydrostatic column from the well drilling mud of the HTMS measurement systems and the formation layer to be analyzed;
b) electrically and electronically triggering a hydraulic pre-test mechanism from a surface equipment, which leads to the following sequential and automatic steps:
  i. introducing the probe barrel or cylinder and the probe filter into the formation,
  ii. shutting the equalizing valve,
  iii. retracting the probe piston into the probe barrel or cylinder, allowing fluid communication between the formation liquid through the grooved cylinder or filter with the flow line, and
  iv. opening the pre-chamber valve of the pre-test chamber allowing the pre-test chamber to be filled with a volume of liquid equivalent to the volume previously selected from the surface;
c) checking drawdown time in the pre-test chamber and recording with the surface equipment the progressive build up time;
d) based on the formation permeability results calculated from the drawdown and build up values, deciding either to collect a sample in one of the sample storage tanks or to drain the flooded area in the measured layer of interest.

14. The process of claim 13, wherein step d), the collection of a sample of the formation in one of several sample tanks is carried out, upon an instruction from the surface equipment, in the following sequence:
  i. opening the tank valve, which puts the flow line in fluid communication with at least one of the sample storage tanks;
  ii. checking drawdown time in the flow line and recording on the surface the progressive build up time in the flow line; and
  iii. upon filling the sample storage tank, triggering from the surface equipment the closing process of at least one sample storage tank.

15. The proceeding of claim 13, wherein draining of the flooded area in the measured layer of interest is performed in the following sequence, upon an instruction from the surface equipment:
  i. opening the equalizing valve in the flow line to let the formation fluid in fluid communication with the hydrostatic column of the well and the pre-test chamber;
  ii. turning on the suction pump in order to drain the flooded area in the formation by the drilling mud taking said product from the formation layer to the hydrostatic column of the well, calculating on the surface the quantity of liters drained through the flow line to the column of the well;
   iii. turning off the suction pump and shutting the equalizing valve of the flow line leaving the equipment in the same initial conditions before draining; and
   iv. waiting until stabilization of pressure in the pre-test chamber.

16. The process of claim 12, wherein, in case the test proves to be successful or fails due to any technical cause or problem in the process (due to plugging of the probe barrel or cylinder, loss of sealing capacity in a seal shoe of the HTMS tool, or low permeability in the formation), the HTMS tool should be detached, triggering from the surface the retract command that will follow the following sequential and automatic steps:
   i. shutting the tank valves;
   ii. opening the equalizing valve;
   iii. ejecting the fluid from the pre-test chamber by displacement of the pre-test piston;
   iv. shutting the prechamber valve of the pre-test chamber;
   v. displacing the probe piston in the probe barrel or cylinder to shut the flow line communication with the formation;
   vi. retracting the probe barrel or piston;
   vii. drawing up the one to two meters of the loosened cable when the HTMS was fixed to the well before measurement;
   viii. detaching the HTMS by retracting the telescopic pistons of the rear shoe and the front shoe thereof;
   ix. going down a few meters to check that the tool does not remain fixed to the well; and
   x. looking for another layer of interest.

17. The process of claim 13, wherein, in any of the situations of filling the pre-test chamber or the sample storage tank or the draining tank of the formation, the values of the measurements in the flow line are registered on the surface equipment by means of the temperature, pressure, conductivity, pH, Calcium content, Sodium content, Magnesium content, and Potassium content gauges.

* * * * *